United States Patent
Iwadate

(10) Patent No.: US 7,209,247 B1
(45) Date of Patent: Apr. 24, 2007

(54) MULTI-FUNCTION IMAGE OUTPUT APPARATUS WITH ERROR CONTROL

(75) Inventor: Masahiro Iwadate, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/479,214

(22) Filed: Jan. 7, 2000

(30) Foreign Application Priority Data

Jan. 18, 1999 (JP) .................................. 11-009909

(51) Int. Cl.
 *H04N 1/40* (2006.01)
 *H04N 1/32* (2006.01)
(52) U.S. Cl. ..................................... 358/1.14; 358/468
(58) Field of Classification Search ............... 358/1.14, 358/436–437, 501–540, 1.9, 426.02–426.11, 358/441, 468
See application file for complete search history.

(56) References Cited

U.S. PATENT DOCUMENTS

| 4,860,119 | A | * | 8/1989 | Maniwa et al. ............. 358/296 |
| 5,507,003 | A | * | 4/1996 | Pipkins ....................... 710/31 |
| 5,532,849 | A | * | 7/1996 | McIntyre et al. ........... 358/534 |
| 5,565,964 | A |   | 10/1996 | Tashiro et al. ................ 399/83 |
| 5,724,154 | A |   | 3/1998 | Ito et al. ...................... 358/400 |
| 6,804,016 | B2 | * | 10/2004 | Hashimoto et al. ........ 358/1.13 |

FOREIGN PATENT DOCUMENTS

| JP | 03155974 A | * | 7/1991 |
| JP | A 7-38686 |   | 2/1995 |
| JP | 10-190920 |   | 7/1998 |

* cited by examiner

*Primary Examiner*—Thomas D. Lee
*Assistant Examiner*—Stephen Brinich
(74) *Attorney, Agent, or Firm*—Fitzpatrick, Cella, Harper & Scinto

(57) ABSTRACT

Disclosed is an image processing apparatus in which image data is generated by a formatter based upon PDL data from a host computer and the image data is output from a printer via an image input/output controller. The apparatus has a scanner unit and a facsimile unit and is capable of transmitting data and of scanning an image while printing is in progress. The formatter senses a service call arising from an error or the like and sends the image input/output controller a request to display this fact. As a result of detection of the error, the image input/output controller halts communication with the formatter and sends a RESET signal to the formatter, whereby the formatter is initialized. Even if an abnormally occurs in a printing function, therefore, recovery of the printing function can be achieved without affecting the scanner and facsimile functions.

15 Claims, 18 Drawing Sheets

FIG. 8A
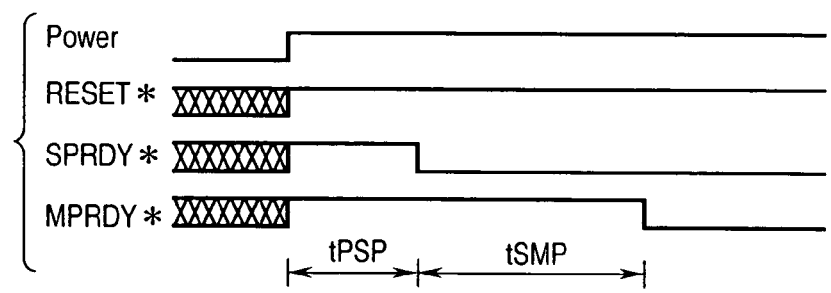
FIG. 8B
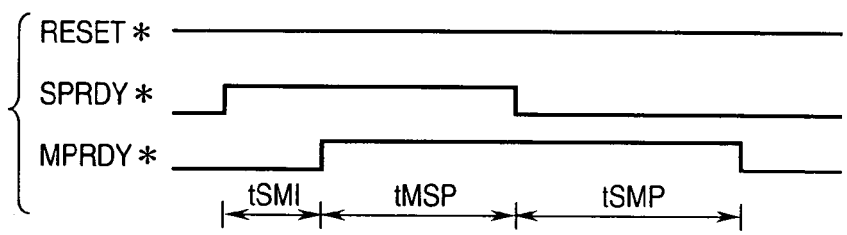
FIG. 8C
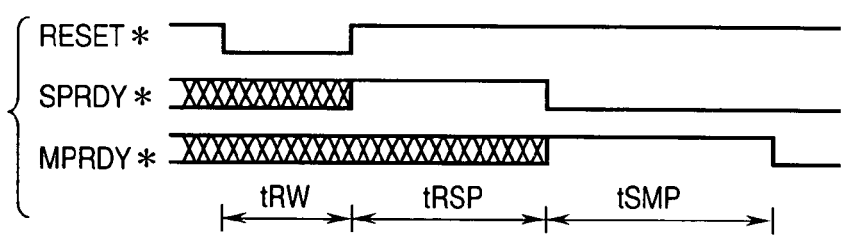
FIG. 8D
| Symbol | Description | Min. | Max. |
|---|---|---|---|
| tPSP | Power On to SPRDY* falling | 100us | - |
| tSMP | SPRDY* falling to MPRDY* falling | 100us | - |
| tSMI | SPRDY* rising to MPRDY* rising | 1s | - |
| tMSP | SPRDY* rising to SPRDY* falling | 100us | - |
| tRW | RESET* Pulse Width | 50ms | - |
| tRSP | RESET* rising to SPRDY* falling | 100us | - |

| LOGICAL PORT NAME | Port ID |
|---|---|
| CONTROL PANEL | 0x0010 |
| STATUS MONITOR | 0x0020 |
| PRINT REQUEST | 0x0030 |

MULTI-FUNCTION IMAGE OUTPUT APPARATUS WITH ERROR CONTROL

BACKGROUND OF THE INVENTION

This invention relates to, e.g., a printer, an image output apparatus which includes the printer and a method of controlling the apparatus. More particularly, the invention relates to an image output apparatus adapted to cope with a case in which a fatal error occurs when an image is formed, and to a method of controlling this apparatus.

In addition to single-function printers, there have been proposed multifunction apparatus equipped with an image reading function such as that of an image scanner and a facsimile communication function, whereby a single apparatus provides a plurality of image input/output functions such as a copy function, facsimile function and printing function.

If data described in page description language (referred to as "PDL data" below) is input when such a printer or multifunction apparatus is used as an image output apparatus, often an image is formed and output on the basis of this data. If a fatal error occurs in such an image output apparatus owing, say, to the inclusion of a command that cannot be interpreted in the entered PDL data, it is proposed to shut down all functions from the moment the error occurs, notify the user of this fact and warn the user so that the user will turn the main power supply off and on.

If the above-described fatal error occurs in a multifunction apparatus having multiple image input/output functions, the main power supply must be turned off and on in order to recover from the error. This means that if another function is being executed concurrently with the function in which the error occurred, this other function also is suspended by turning off the main power supply. For example, assume an instance where printing processing develops a fatal error, e.g., an error in which a command that cannot be interpreted is received, when the reception and printing of PDL data are being executed in parallel with facsimile reception. If the main power supply is not shut down in such case, recovery of the printing function will not take place. The problem is that facsimile reception also must be interrupted.

SUMMARY OF THE INVENTION

Accordingly, an object of the present invention is to provide an image output apparatus, as well as a method of controlling the same, in which even when the printing function develops a fatal error, the printing function can be restored in such a manner that functions not utilizing the printing function are unaffected.

According to one aspect of the present invention, there is provided an image output apparatus including an image generator, a controller and an image forming unit. The image generator generates bitmap data based upon page description language transmitted from a host computer. The controller receives the bitmap data generated by the image generator and transmits the data to an image forming unit, which records an image on a recording medium based upon the bitmap data. The controller judges that an error has occurred in the image generator if an instruction that has been transmitted to the image generator is not responded to in a predetermined period of time, and when it detects an occurrence of an error, issues to the image generator an order to execute a reset and, in response the image generator executes a reset. Also, when an error has been detected, the controller does not send an order to execute a reset to the image forming unit.

According to other aspects of the present invention, the controller issues the order to the image generator to reset, in response to an instruction to initialize or to reset, entered via a display unit, or in another aspect, the controller, in the event of detecting the occurrence of an error in the image generator, halts communication with the image generator and notifies an operator of occurrence of the error by a display or sound before issuing the order to execute initialization or reset.

In a preferred embodiment, the apparatus further comprises conversion means for reading in an image and converting the image to image data.

In a preferred embodiment, the apparatus further comprises means for sending and receiving image data via a communication line.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 8A to 8D are diagrams showing the timings of a RESET* signal, SPRDY* signal and MPRDY* signal;

DESCRIPTION OF THE PREFERRED EMBODIMENTS

First Embodiment

Figure 1:
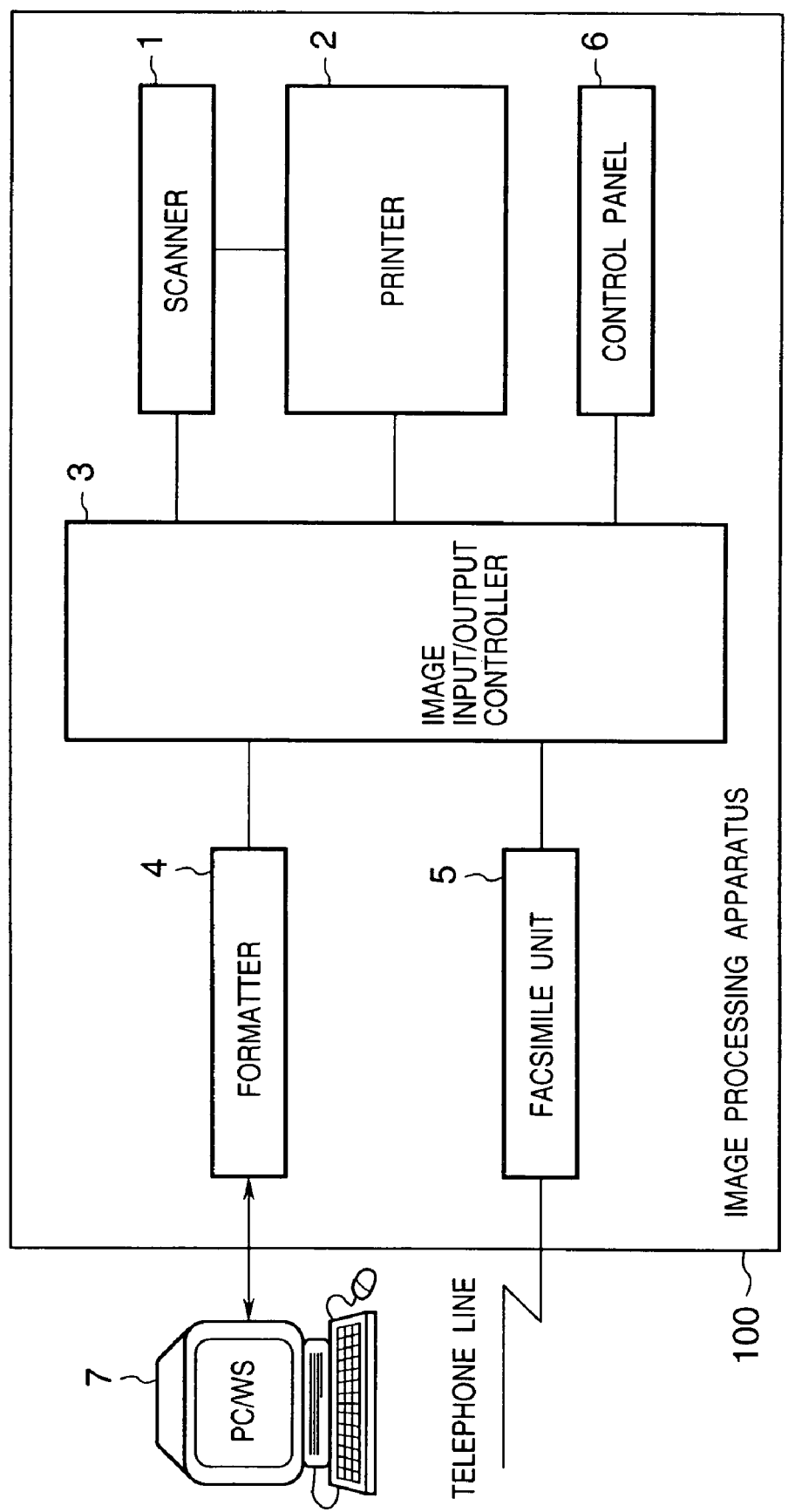
FIG. 1 is a block diagram illustrating an example of the overall construction of an image processing apparatus according to an embodiment of the present invention.

FIG. 1 is a block diagram illustrating the construction of an image processing apparatus 100 according to a first embodiment of the present invention.

As shown in FIG. 1, a scanner 1 reads a document and outputs image data conforming to the document image to a printer 2 or image input/output controller 3.

The printer 2 prints an image on printing paper based upon image data that enters from the scanner 1 or image input/output controller 3.

The image input/output controller 3 is connected to the scanner 1, the printer 2, a formatter 4, a facsimile unit 5 and a control panel 6 and functions as a main controller for exercising overall control of these components.

The formatter 4 generates image data (bitmap data), which can be printed by the printer 2, from image data (e.g., PDL data) transferred from an information processing apparatus 7 and transfers the generated image data to the image input/output controller 3. Various information relating to the components of the overall image processing apparatus 100 and the operating status thereof are transferred to the information processing apparatus 7.

The facsimile unit 5 expands compressed image data received via a telephone line, transfers the expanded image data to the image input/output controller 3, compresses image data transferred from the image input/output controller 3 and transmits the compressed image data to external equipment (not shown) via a telephone line.

In accordance with orders from the image input/output controller 3, the control panel 6 displays a screen for allowing the user to make various settings and reports the content of the user settings to the image input/output controller 3.

Figure 2:
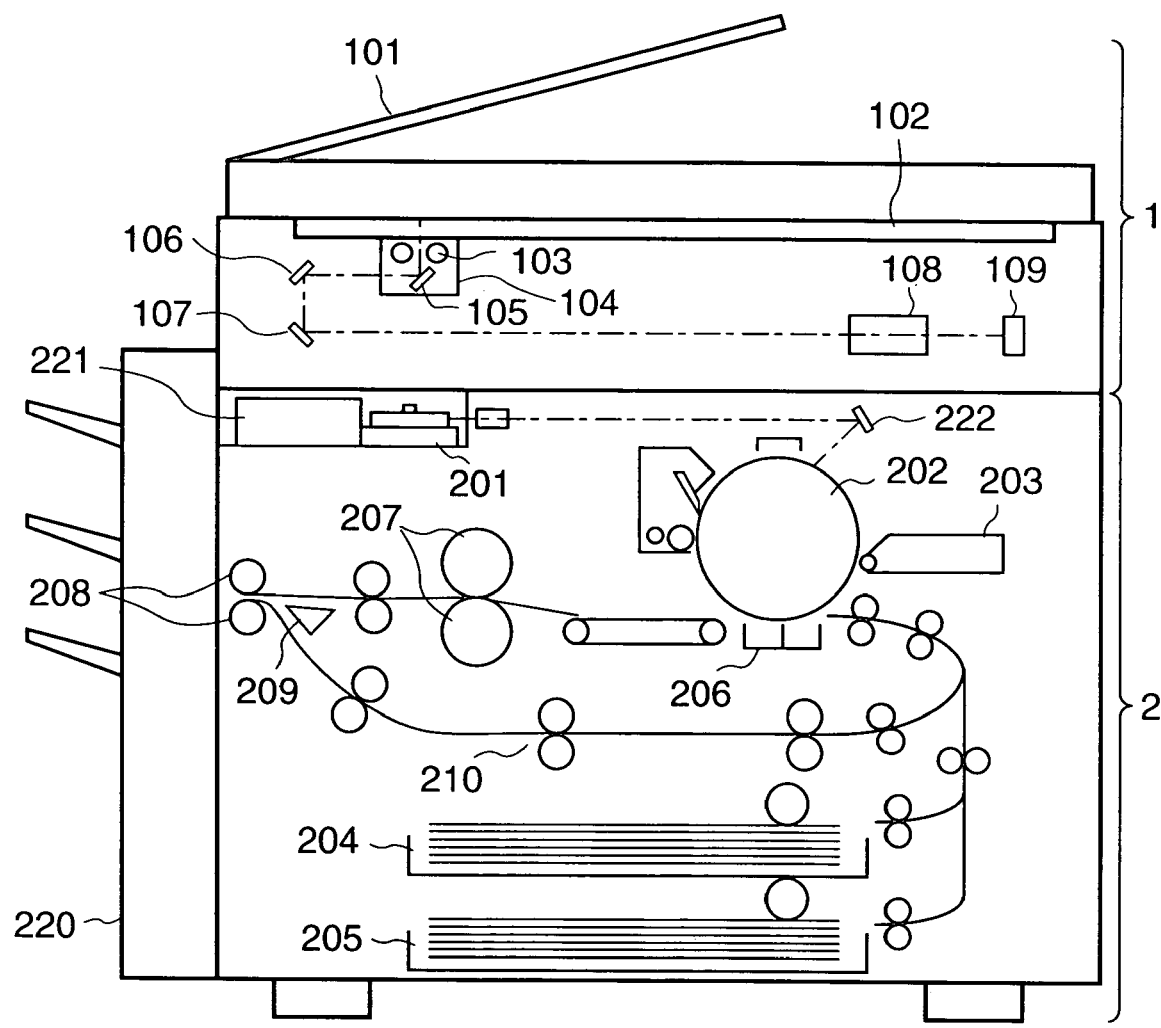
FIG. 2 is a sectional view showing an example of the construction of a scanner and printer.

FIG. 2 is a sectional view showing an example of the construction of the scanner 1 and printer 2.

The scanner 1 has a document feeder 101 for feeding documents to a glass platen 102 one at a time from the last page of the stack and ejecting a document from the glass platen 102 whenever the reading of each document ends. When a document is transported to the glass platen 102, a lamp 103 is lit, movement of a scanner unit 104 is started and the document is scanned to expose it to light. Light reflected from the document at this time is introduced to a CCD image sensor (referred to as a "CCD" below) 109 by mirrors 105, 106, 107 and a lens 108. The image data thus read is subjected to predetermined processing and then transferred to the printer 2 and image input/output controller 3.

The printer 2 has a laser driver 221 which drives a laser emission unit 201 so that the latter will emit a laser beam based upon the image data that has been output from the scanner 1. The laser beam irradiates a photosensitive drum 202 on which is formed a latent image conforming to the laser light. A developing unit 203 causes a developing agent to attach itself to the latent image formed on the photosensitive drum 202.

Printing paper is transported to a transfer unit 206 from a cassette 204 or 205 at a timing synchronized to the start of the laser emission, as a result of which the developing agent affixed to the photosensitive drum 202 is transferred to the printing paper. The printing paper to which the developing agent has been transferred is transported to a fixing unit 207, where the developing agent is fixed on the printing paper by heat and pressure supplied by the fixing unit 207. Upon passing through the fixing unit 207, the printing paper is ejected by ejection rollers 208. The ejected paper is then placed in an appropriate bin by a sorter 220, thereby sorting the multiple sheets of recording paper after they are ejected.

It should be noted that the sorter 220 will place recording paper in the uppermost bin if the apparatus has not been set to the sorting mode. If the apparatus has been set to a double-sided printing mode, recording paper is transported up to the position of the ejection rollers 208, the rotating direction of the ejection rollers 208 is reversed and the paper is introduced to the paper feed path again by a flapper 209. If the apparatus has been set to a multiple-printing mode, the recording paper is introduced to the paper feed path again by the flapper 209 in such a manner that the paper will not be transported as far as the ejection rollers 208. Printing paper thus re-introduced to the paper feed path is fed to the transfer unit 206 again at the above-mentioned timing.

Figure 3:
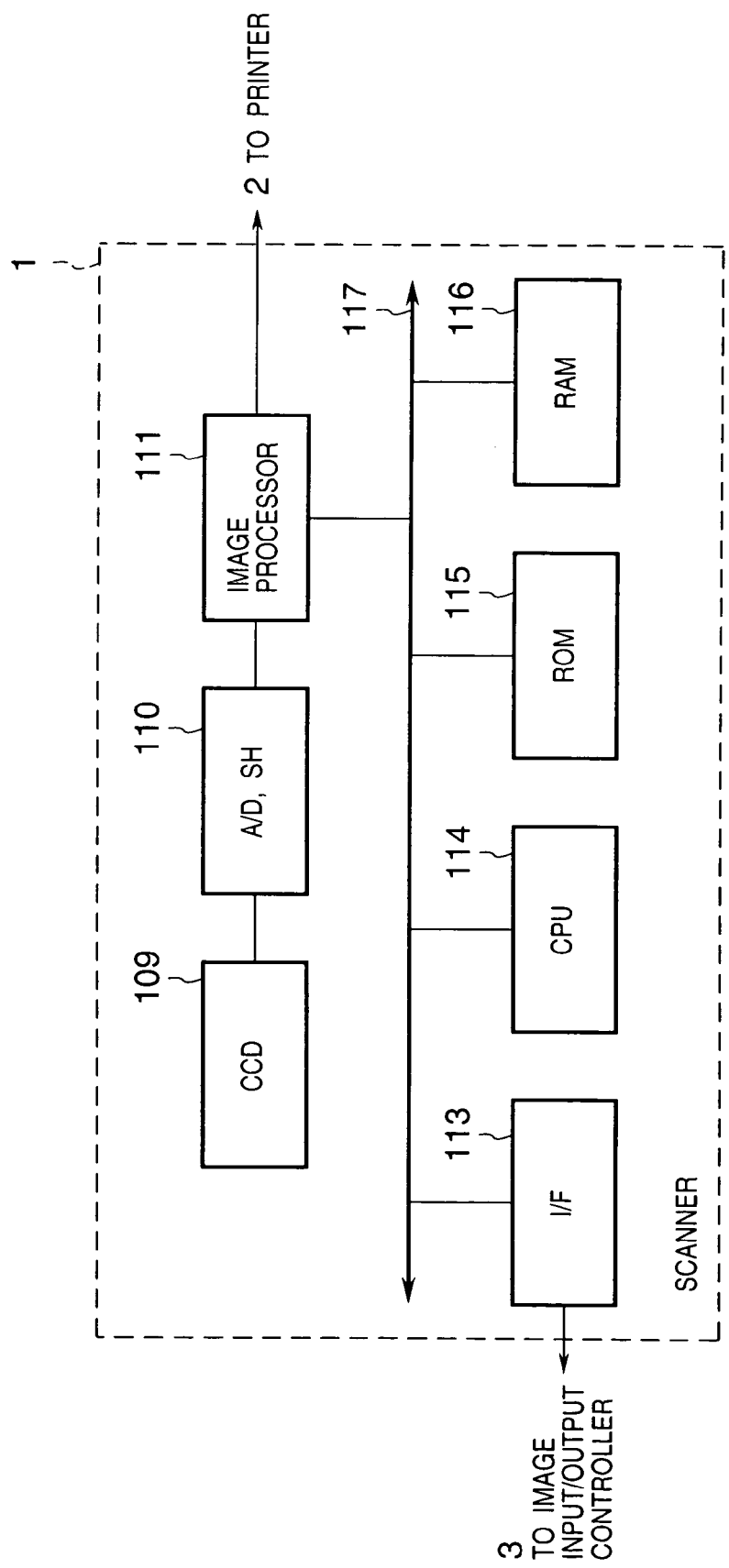
FIG. 3 is a block diagram showing an example of the details of construction of the scanner.

FIG. 3 is a block diagram showing an example of the details of construction of the scanner 1. An image processor 111, an interface (I/F) 113, a ROM 115 and a RAM 116 are connected to a CPU bus 117 of a CPU 114 in the manner illustrated.

Image data output from the CCD 109 undergoes an analog-to-digital conversion as well as a shading correction in an A/D & shading unit 110. Image data that has been processed by the A/D & shading unit 110 is transferred to the printer 2 via the image processor 111 and is transferred to the image input/output controller 3 via the interface 113.

The CPU 114 controls the image processor 111 and the interface 113 in dependence upon the content of a setting indicated by the image input/output controller 3. For example, if a mode for performing copying after trimming processing has been designated, trimming processing is executed by the image processor 111 and the processed image data is transferred to the printer 2. If a facsimile transmission mode has been designated, image data that has been read is transferred to the image input/output controller 3 via the interface 113. The control program of the CPU 114 which exercises such control has been stored in the ROM 115. The CPU 114 operates on the basis of this control program in ROM 115. The RAM 116 is used as a working area of the CPU 114.

Figure 4:
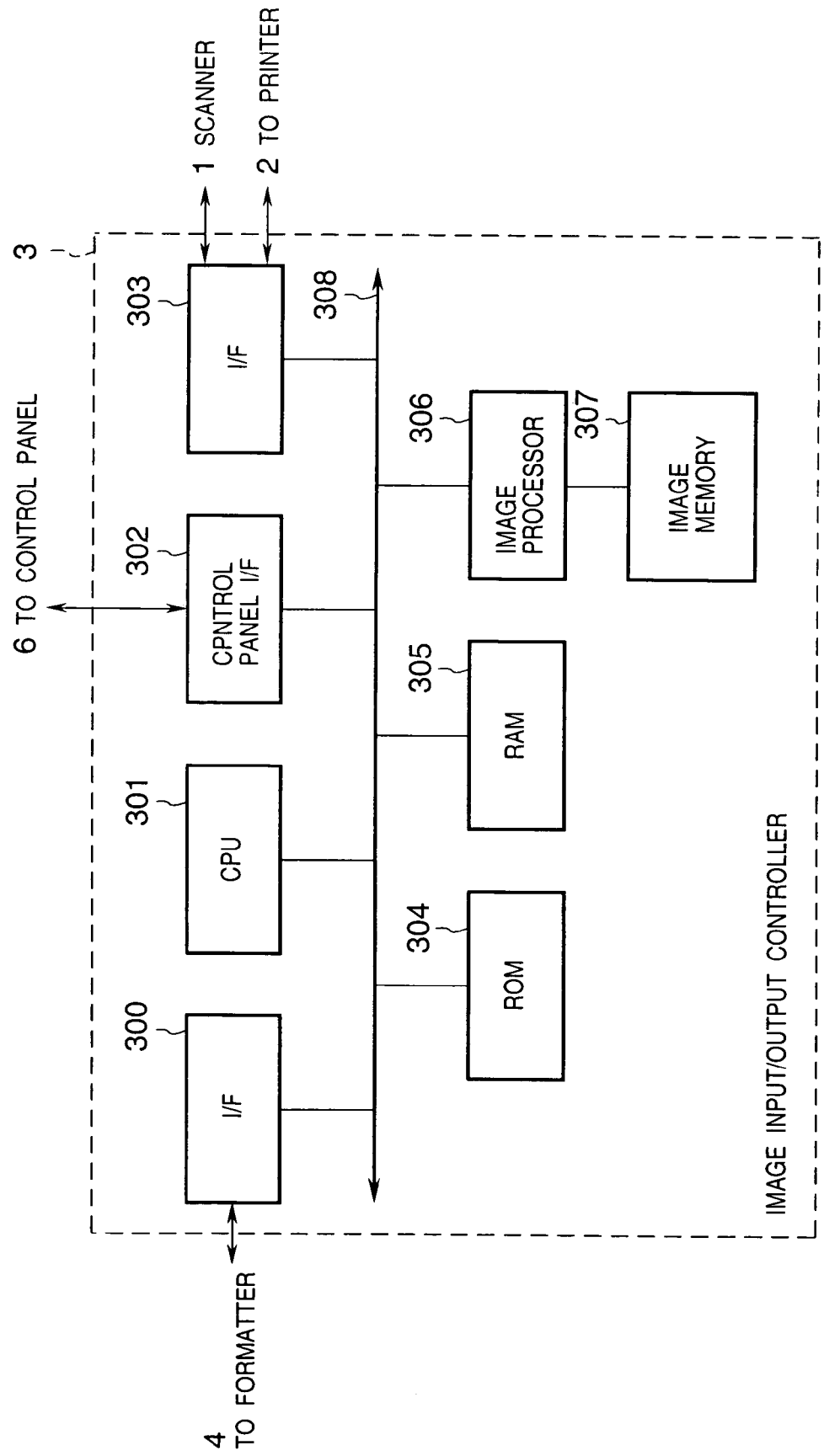
FIG. 4 is a block diagram showing an example of the details of construction of an image input/output controller.

FIG. 4 is a block diagram showing an example of the details of construction of the image input/output controller 3. An interface 300, a control-panel interface (I/F) 302, an interface 303, a ROM 304, a RAM 305 and an image processor 306 are connected to a CPU bus 308 of a CPU 301 in the manner illustrated.

Image data that enters from the scanner 1 is transferred to the image processor 306 via the interface 303 and is then stored in an image memory 307. A control command that enters from the scanner 1 is transferred to the CPU 301.

Image data that enters from the formatter 4 and facsimile unit 5 is transferred to the image processor 306 via the interface 300 and is then stored in the image memory 307. Control commands that enter from the formatter 4 and facsimile unit 5 are transferred to the CPU 301.

Under the control of the CPU 301, these images that have been stored in the image memory 307 are subjected to image processing such as image rotation processing and scaling processing in the image processor 306 based upon control commands that enter from the scanner 1, formatter 4, facsimile unit 5 and control panel 6. The processed images are then transferred to the printer 2 via the interface 303. Alternatively, the processed images are transferred to the facsimile unit 5 via the interface 300.

If, from among the control commands that have entered from the scanner 1, formatter 4 and facsimile unit 5, the CPU 301 receives a command requesting a display on the control panel 6, then the CPU 301 causes the designated display content to be displayed on the control panel 6 via the control-panel interface 302. If the user performs an operation at the control panel 6, information indicative of this information is input to the CPU 301 via the interface 302. The CPU 301 transfers the operating information that has entered from the control-panel interface 302 to the scanner 1, formatter 4 and facsimile unit 5. Alternatively, the CPU 301 executes image input/output control based upon the operating information.

The control program of the CPU 301 that exercises this control has been stored in the ROM 303. The CPU 301 operates on the basis of this control program in ROM 303. The RAM 304 is used as a working area of the CPU 301.

Figure 5:
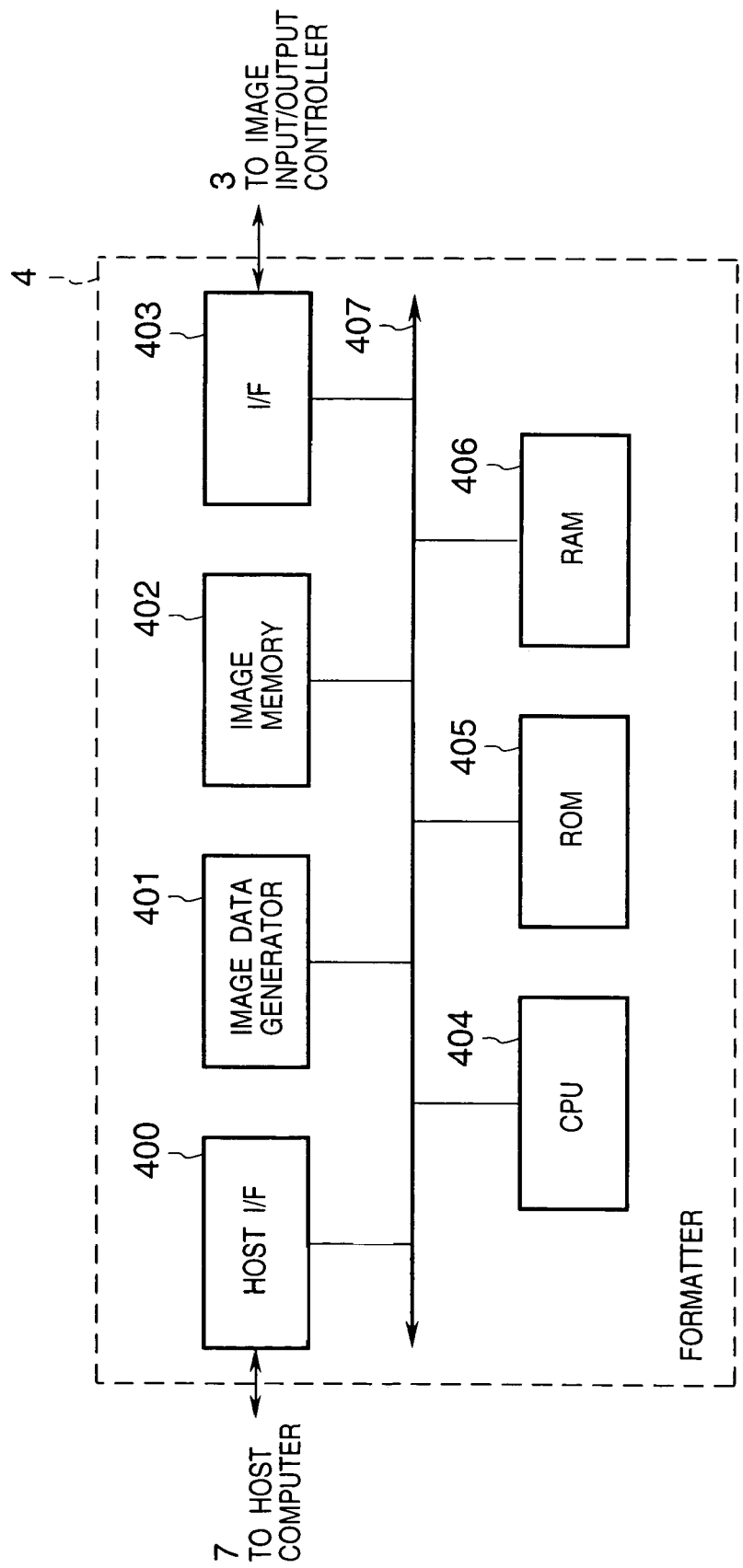
FIG. 5 is a block diagram showing an example of the details of construction of a formatter.

FIG. 5 is a block diagram showing an example of the details of construction of the formatter 4. A host interface (I/F) 400, an image data generator 401, an image memory 402, an interface 403, a ROM 405 and a RAM 406 are connected to a CPU bus 407 of a CPU 404.

PDL data that has been sent from the host computer 7 is stored in the RAM 406 via the host interface 400 such us a LAN interface or centronics interface. The CPU 404 interprets the PDL data that has been stored in the RAM 406 and transfers data for creating a bitmap image to the image data generator 401. The image data generator 401 converts the data sent from the CPU 404 to a bitmap image. The bitmap image that has been created is stored in the image memory 402.

The CPU 404 extracts the bitmap image that has been stored in the image memory 402, transfers the bitmap image to the image input/output controller 3 via the interface 403 and transfers the output destination of the image to be transferred as well as a control command specifying an output setting. Further, the CPU 404 executes various types of control based upon information indicating operation of the control panel 6 transferred from the image input/output controller 3. For example, if an operation for clearing a receive buffer in the formatter 4 is performed at the control panel 6, notification of this fact is given by the image input/output controller 3. In accordance with orders from the image input/output controller 3, the CPU 404 clears received data that has been stored in the RAM 406.

The control program of the CPU 404 which exercises such control has been stored in the ROM 405. The CPU 404 operates on the basis of this control program in ROM 405. The RAM 406 is used as a working area of the CPU 404.

Figure 6:
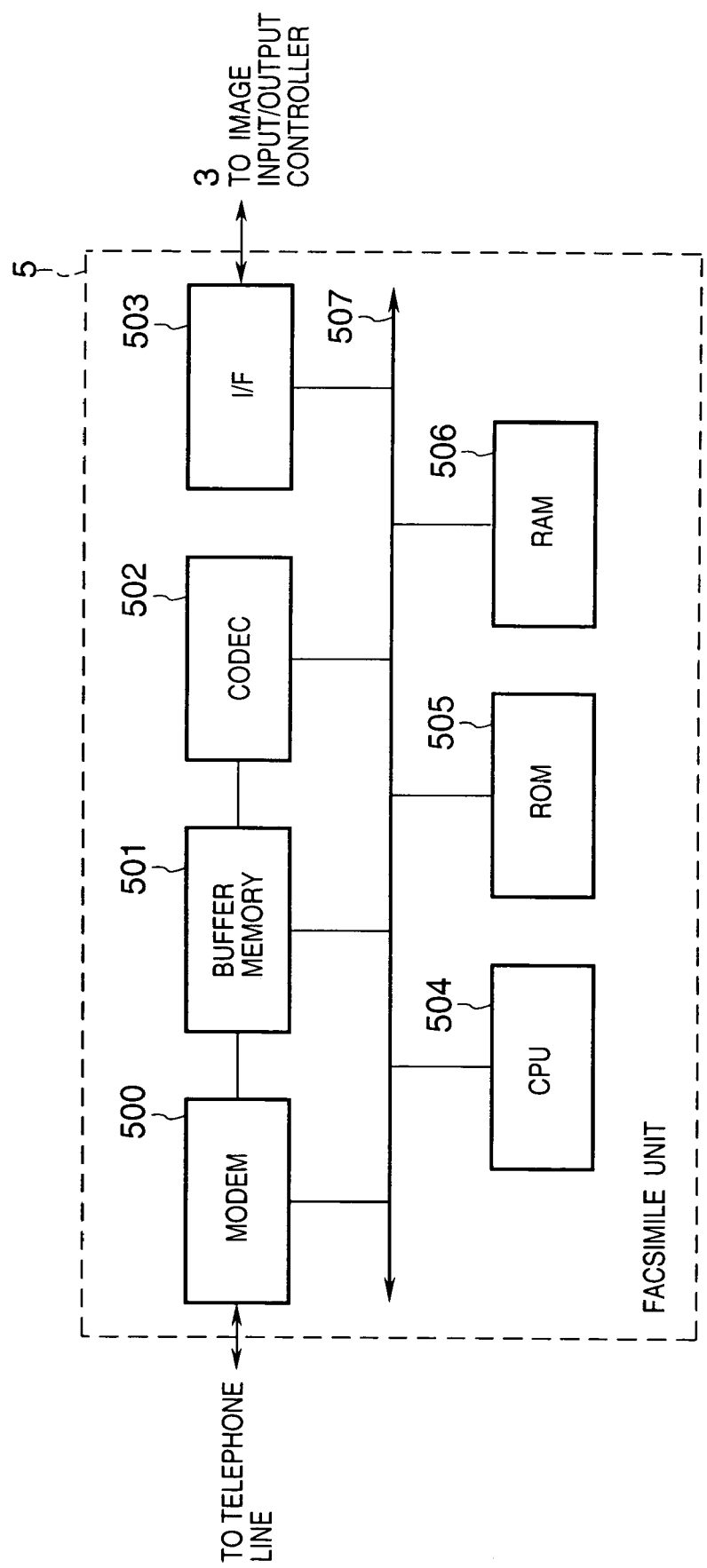
FIG. 6 is a block diagram showing an example of the details of construction of a facsimile unit.

FIG. 6 is a block diagram showing an example of the details of construction of the facsimile unit 5. A modulator/demodulator (MODEM) 500, a buffer memory 501, a coder/decoder (CODEC) 502, an interface 503, a ROM 505 and a RAM 506 are connected to a CPU bus 507 of a CPU 504.

At the time of facsimile reception, data received from the telephone line is demodulated by the modem 500 and stored in the buffer memory 501. The CPU 504 extracts the data that has been stored in the buffer memory 501 and sends the data to the coder/decoder 502 so that the data is decoded to create a bitmap image.

The CPU 502 transfers the created bitmap image to the image input/output controller 3 and transfers the output destination of the image to be transferred as well as a control command specifying an output setting.

At the time of facsimile transmission, an image that has been transferred from the image input/output controller 3 is transferred by the CPU 505 to the coder/decoder 502 and is coded thereby, after which the coded data is stored in the buffer memory 501. At this time various setting information relating to facsimile transmission such as a telephone number is transferred from the image input/output controller 3 to the CPU 504. The latter makes various facsimile transmission settings based upon these items of information sent from the image input/output controller 3 and then extracts the transmission information, which has been stored in the buffer memory 501. The extracted information is modulated by the modem 500 and transferred to the telephone line.

Display-screen and configuration information relating to the operation of the facsimile unit 5 is stored in the ROM 505 and RAM 506 in advance. The CPU 504 extracts this information as necessary and transfers it to the image input/output controller 3 via the interface 503. Further, the CPU 504 executes various types of control based upon information indicating operation of the control panel 6 transferred from the image input/output controller 3. For example, if an operation for outputting the communication management report of the facsimile unit 5 is performed at the control panel 6, notification of this is given by the image input/output controller 3. In accordance with the indication from the image input/output controller 3, the CPU 504 creates a bitmap image of the communication management report and transfers the bitmap image to the image input/output controller 3 via the interface 503.

The control program of the CPU 504 which exercises such control has been stored in the ROM 505. The CPU 504 operates on the basis of this control program in ROM 505. The RAM 506 is used as a working area of the CPU 404.

Figure 15:
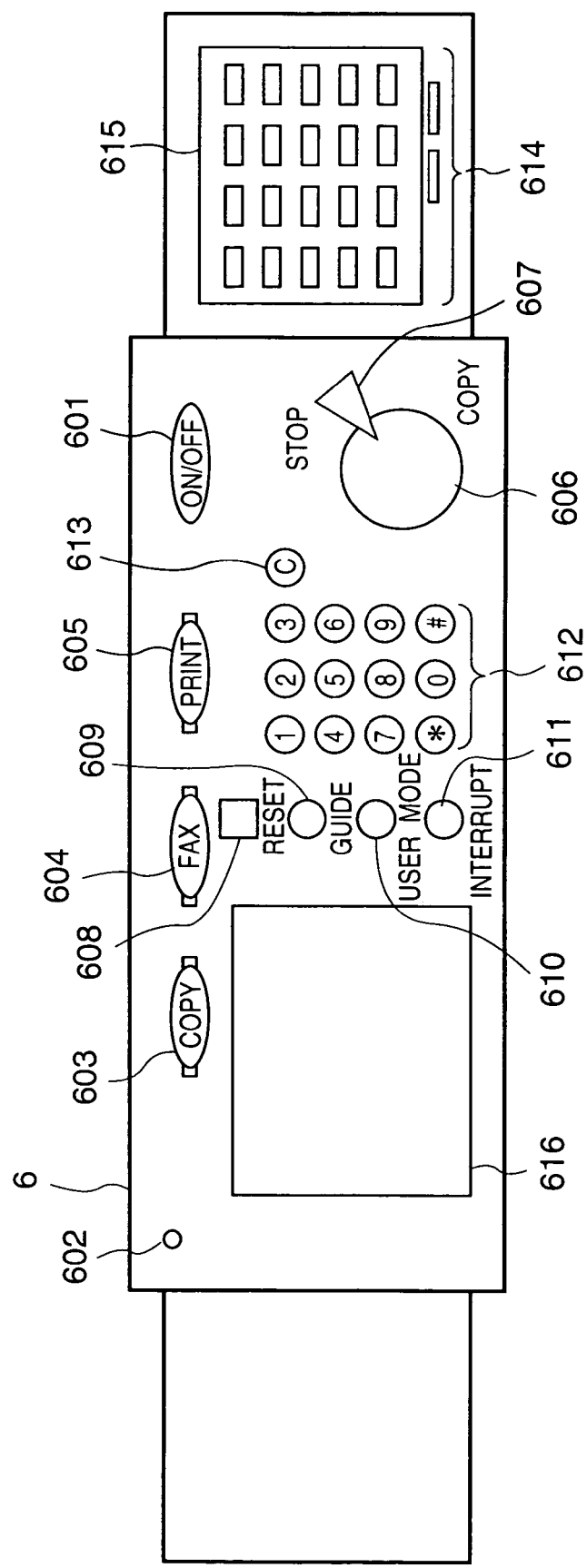
FIG. 15 is a diagram showing the appearance of a control panel.

FIG. 15 illustrates the appearance of the control panel 6.

A main power lamp 601 lights when the power supply is turned on. A power switch (not shown) is disposed on the side face of the main body and controls the feed of current to the main body. A preheat key 602 is used turn a preheating mode on and off. A copy mode key 603 is used when a copy mode is selected from a plurality of functions. A facsimile mode key 604 is used when a facsimile mode is selected from the plurality of functions. A printer mode key 605 is used when a printer mode is selected from the plurality of functions, and a copy start key 606 is used when the start of copying is designated. A stop key 607 is used to suspend or terminate copying. A reset key 608 operates in the copy mode as a key for restoring a standard mode. A guide key 609 is used when the operator wishes to obtain information about the various functions available. A user mode key 610 is used when the basic configuration of the system is changed. An interrupt key 611 is used when it is desired to make a copy upon interrupting a copying operation that is in progress. Numeric keys 612 are used when a numerical value is to be entered. A clear key 613 is used when a numerical value is to be cleared. There are 20 single-touch dialing keys 614 used for single-touch dialing during facsimile transmission. A double cover 615 comprises two covers in which key areas corresponding to the single-touch dialing keys 614 have been cut out. A first state in which both covers have been closed, a second state in which only the first cover has been opened and a third state in which both covers have been opened are sensed by a sensor switch, not shown. The operation of the single-touch dialing keys 614 is decided by these three opened/closed combinations of the covers. According to this embodiment, therefore, an effect equivalent to the provision of 60 (=20×3) keys is obtained. A touch-sensitive panel 616, which comprises a combination of a liquid-crystal screen and touch sensor, displays a separate setting screen for each mode. By touching a key displayed on the touch panel 616, it is possible to make a variety of detailed settings.

Figure 16A:
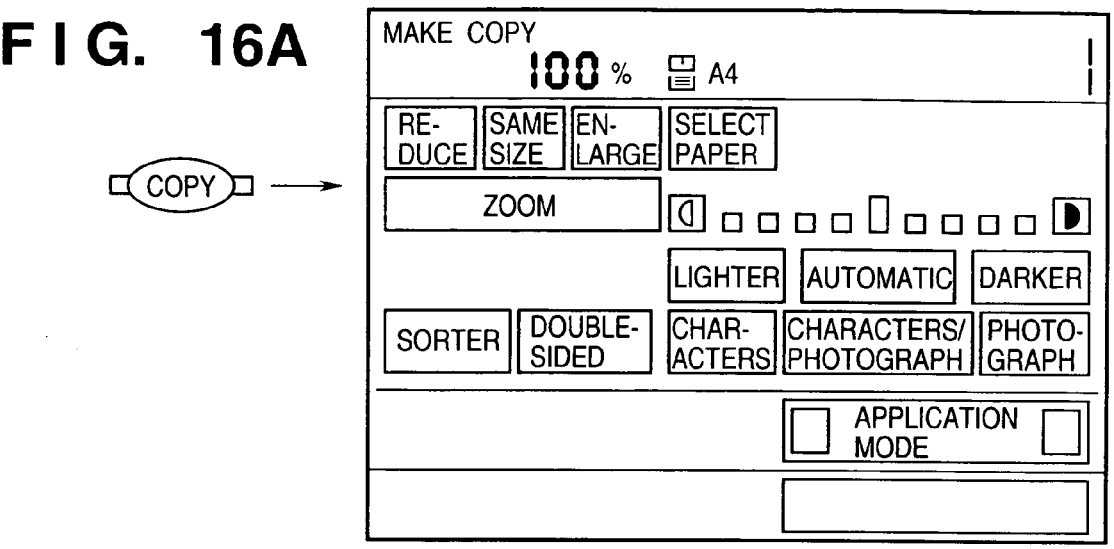
FIGS. 16A to 16C are diagrams illustrating examples of initial screens of various mode functions.
Figure 16B:
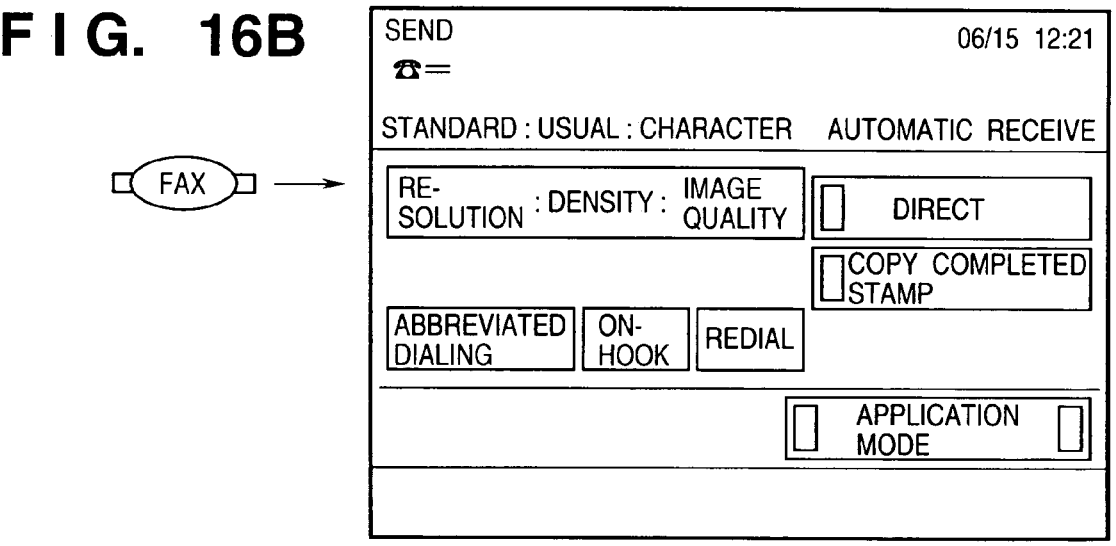
Figure 16C:
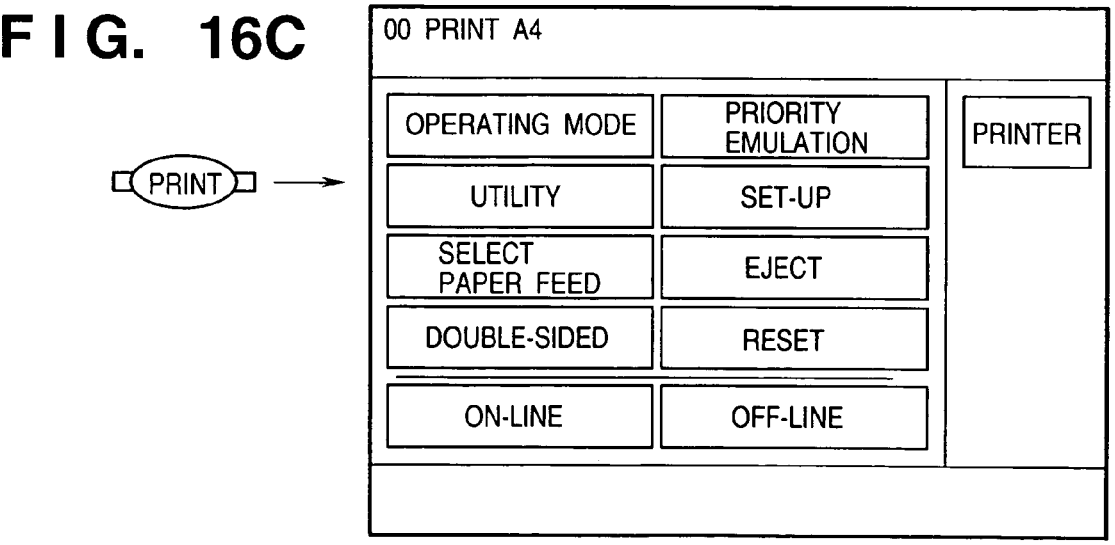

FIGS. 16A to 16C are diagrams illustrating examples of initial screens displayed on the touch panel 616 in a case where various function mode keys are pressed.

FIGS. 16A, 16B and 16C respectively illustrate an initial screen for a copying operation in a case where the copy mode key 603 has been pressed, an initial screen for a facsimile operation in a case where the facsimile mode key 604 has been pressed, and an initial screen for a printer operation in a case where the printer mode key 605 has been pressed.

Thus, it is possible to execute processing that combines such functions as reading documents, printing images, generating images, sending and receiving images and saving images, with the focus of these operations being the image input/output controller 3.

Communication between the formatter 4 and the image input/output controller 3 according to this embodiment will now be described in detail.

Figure 7:
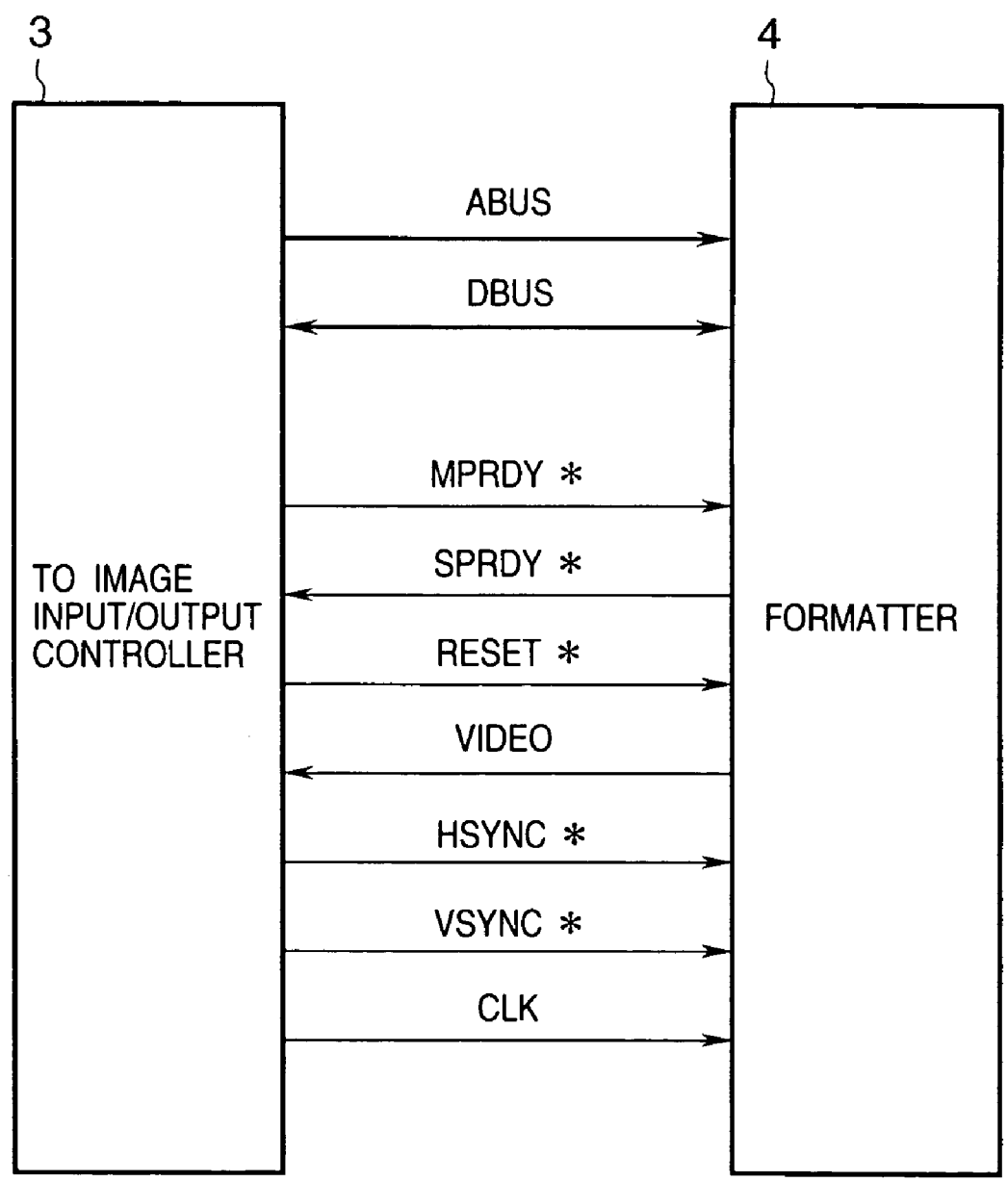
FIG. 7 is a diagram showing signal lines between the formatter and the image input/output controller.
Figure 9:
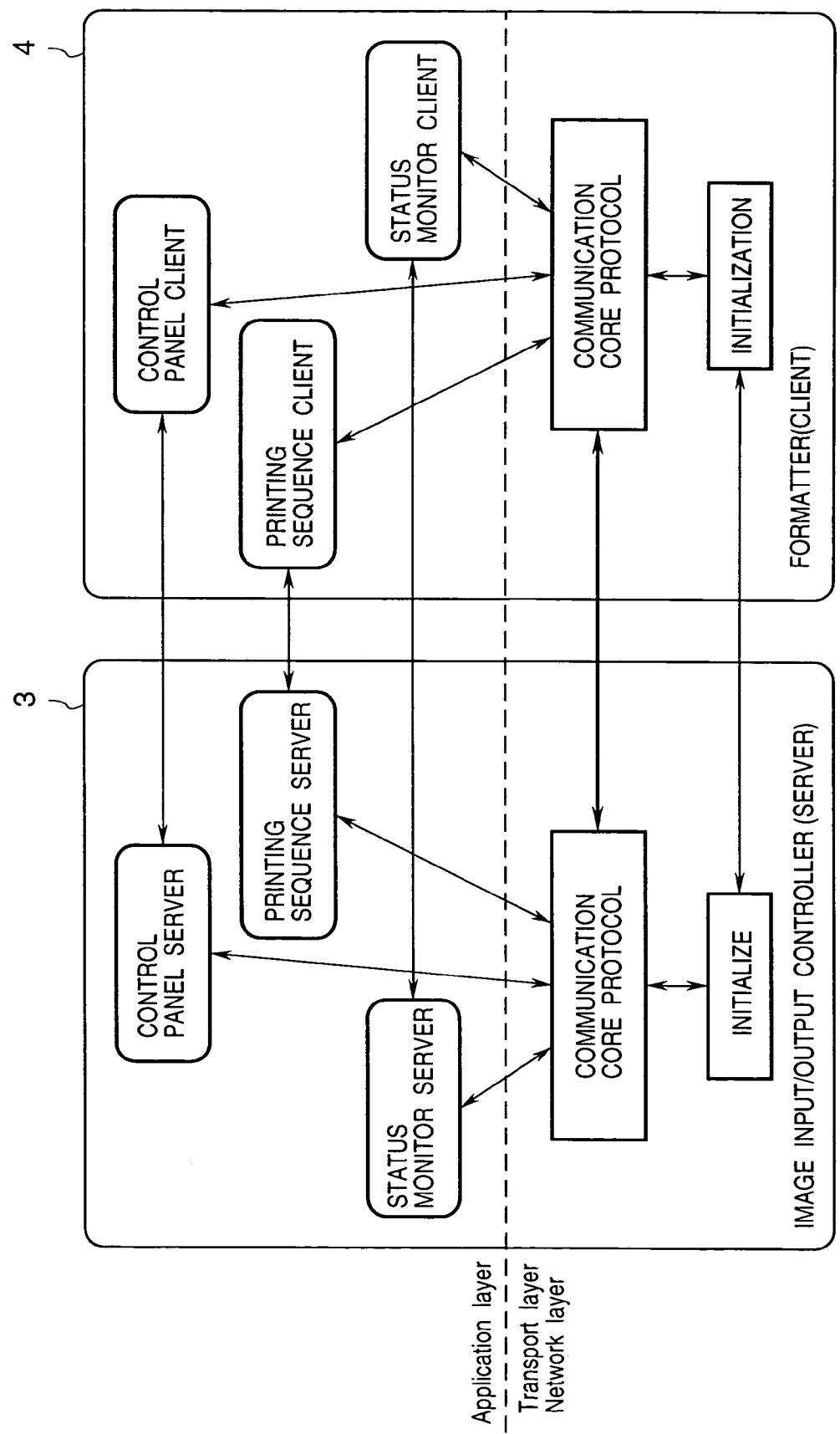
FIG. 9 is a diagram conceptually illustrating exchange of commands between the formatter and the image input/output controller.

The formatter 4 and the image input/output controller 3 are connected by signals illustrated in FIG. 7.

An ABUS signal indicates a CPU address bus and a DBUS signal indicates a CPU data bus. An MPRDY* signal gives notification of the fact that the image input/output controller 3 has started, and an SPRDY* signal given notification of the fact that the formatter 4 has started. A RESET* signal is a signal through which the image input/output controller 3 resets the formatter 4, and a VIDEO signal is an image-data signal. HSYNC* and VSYNC* signals are image-data horizontal and vertical synchronizing signals, respectively. A CLK signal is a synchronizing signal for when image data is output.

The timing of the SPRDY* signal output from the formatter 4 to the image input/output controller 3 and the timings of the MPRDY* and RESET* signals that enter the formatter 4 from the image input/output controller 3 will now be described with reference to FIGS. 8A to 8C. Further, FIG. 8D indicates the meanings of symbols tX, which represent the periods of time illustrated in FIGS. 8A to 8C.

FIG. 8A illustrates the timing of each signal when power is introduced.

When power is introduced, the formatter 4 activates the SPRDY* signal upon elapse of a predetermined period of time (tPSP). The image input/output controller 3 detects the activation of the SPRDY* signal and then activates the MPRDY* signal upon elapse of a predetermined period of time (tSMP).

FIG. 8B illustrates the timing of each signal when the image input/output controller 3 has detected deactivation of the SPRDY* signal. This illustrates operation in a case where the formatter 4 is subjected to hard reset (re-introduction of power) when it is operating normally. When the image input/output controller 3 detects deactivation of the SPRDY* signal, it activates the MPRDY* signal after a predetermined period of time (tSMI). When activation of the SPRDY* signal is detected after a predetermined period of time (tMSP), the image input/output controller 3 activates the MPRDY* signal again after a predetermined period of time (tSMP).

FIG. 8C illustrates the timing of each signal when the image input/output controller 3 has issued the RESET* signal to the formatter 4. This illustrates operation in a case where, because of a fatal error that has occurred in the formatter 4, the formatter 4 is forcibly reset by an order from the image input/output controller 3.

When the image input/output controller 3 activates the RESET* signal for a predetermined period of time (tRW), a CPU reset operation is performed in the formatter 4 and the formatter 4 attains a state in which power is re-introduced. Thereafter, in a manner similar to that when power is introduced in the usual manner, the formatter 4 activates the SPRDY* signal after a predetermined period of time (tRSP). After the image input/output controller 3 has detected activation of the SPRDY* signal, it activates the MPRDY* signal following elapse of the predetermined period of time (tSMP).

Described next will be the protocol of communication between the formatter 4 and image input/output controller 3. FIGS. 9 to FIGS. 11A, 11B are diagrams conceptually illustrating exchange of commands between the formatter 4 and image input/output controller 3. These diagrams will be described below.

Figure 10:
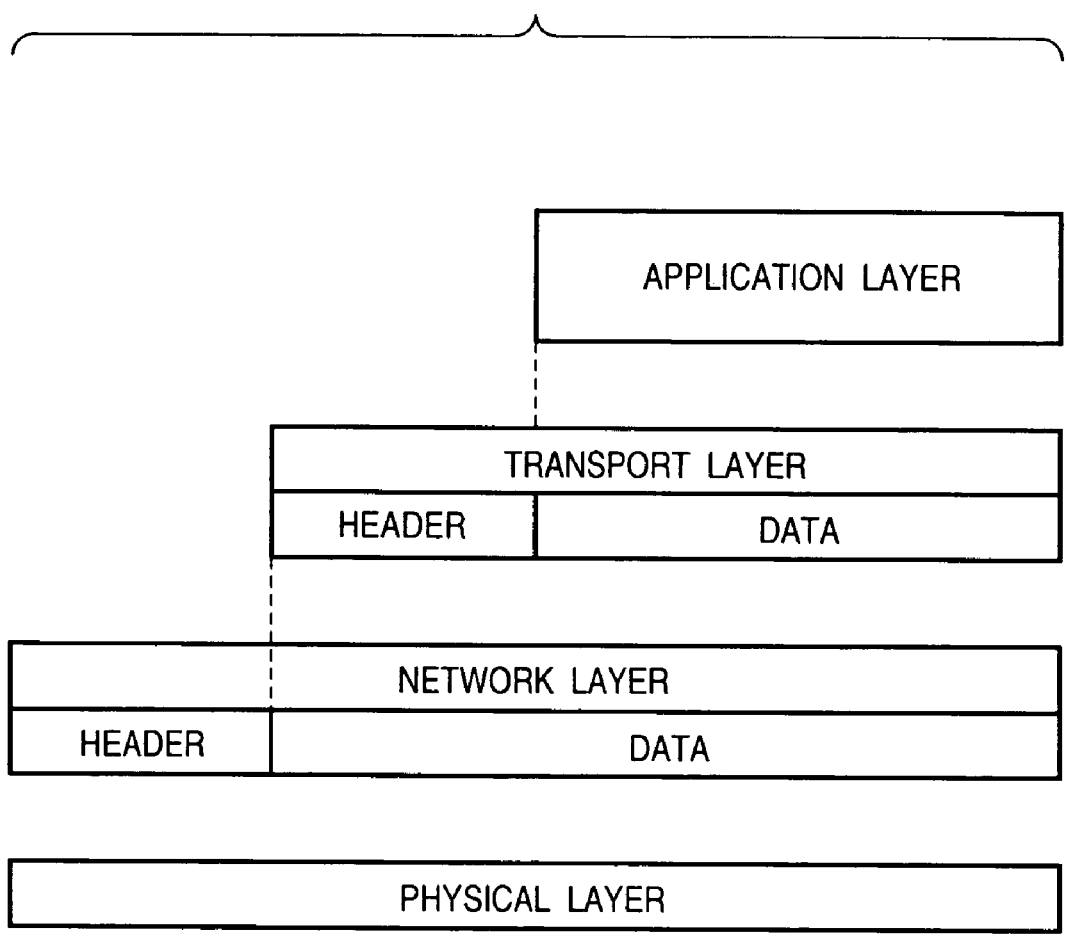
FIG. 10 is a diagram conceptually illustrating a communication protocol having an ordinary layer structure.

The communication protocol has an ordinary hierarchical structure of the kind shown in FIG. 10. The physical layer indicates a physical interface. This is a layer for transferring the header and data of a network layer. The network layer is a layer having a header for performing packet control. A transport layer has the transmission source of a data transfer and a logical port of the transmission destination, etc., as a header. An application layer defines commands for implementing actual functions.

In the application layer, the formatter 4 and image input/output controller 3 each have a software module for each function. For example, there is a module of a printing sequence for image transfer back and forth, a module of the control panel for performing an exchange of operation/display using the control panel 6, and a module of a status monitor for performing an exchange of status information.

Figures 11A, 11B:
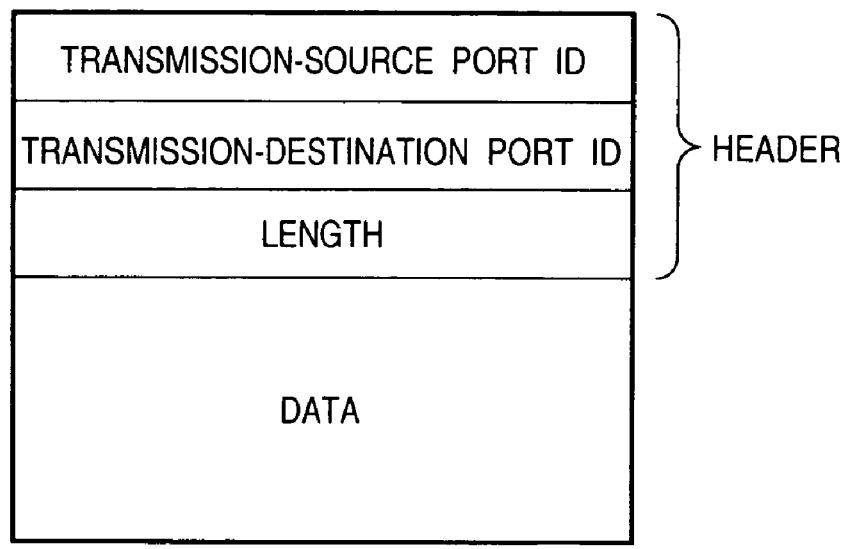
FIGS. 11A and 11B are diagrams showing the data structure of a transport layer.

FIG. 11A is a diagram illustrating the data structure of the transport layer. The header is composed of a transmission-source port ID indicating the logical port of the source of a data transfer, a transmission-destination port ID indicating the logical port of the destination of a data transfer, and a length field indicating the length of data. Commands actually exchanged are set in the data. FIG. 11B illustrates the port IDs and the corresponding logical port names.

Thus, client-server communication is performed between software modules in which the image input/output controller 3 is likened to a server and the formatter 4 is likened to a client.

Figure 12:
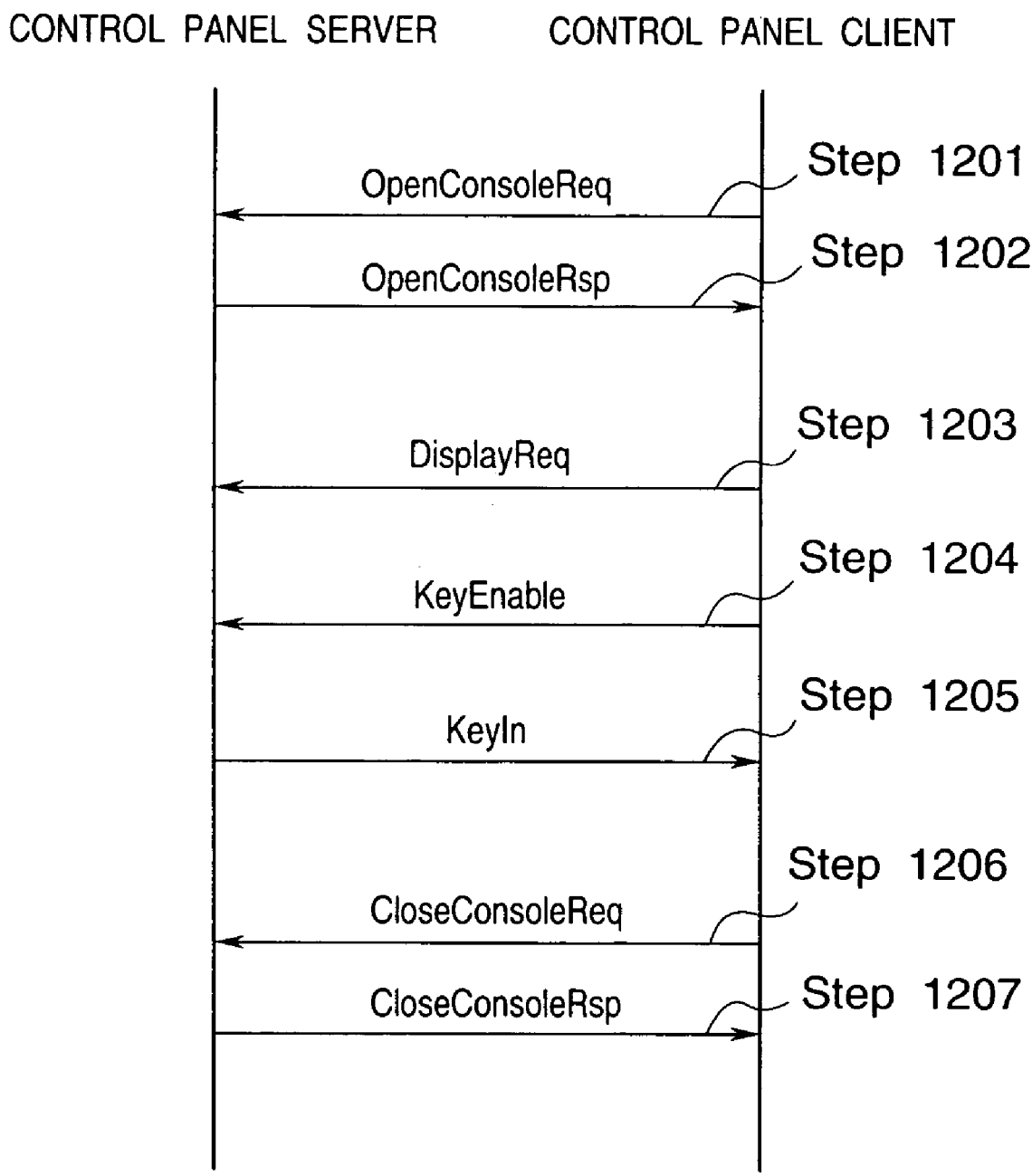
FIG. 12 is a diagram illustrating a communication sequence in a logical port control panel between the image input/output controller and formatter.

Described next will be an exchange in the control panel, which is one of the logical ports, that takes place between the formatter 4 and the image input/output controller 3. FIG. 12 is a diagram illustrating the control-panel sequence, and FIG. 13 illustrates commands that are actually exchanged.

Figure 13A:
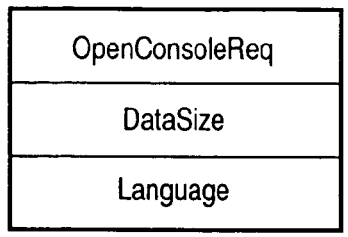
FIGS. 13A to 13H are diagrams showing the data structures of commands used in the communication sequence of FIG. 12.

After power is introduced, the formatter 4 sends the image input/output controller 3 an OpenConsoleReq command for setting up the control-panel sequence (step 1201 in FIG. 12). FIG. 13A illustrates the structure of the OpenConsoleReq command. OpenConsoleReq represents the type of command, Datasize indicates the length of data that follows the command, and Language indicates the language code used.

Figure 13B:
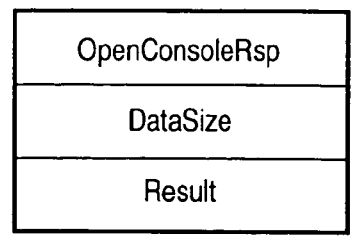

The image input/output controller 3 responds to this command by issuing an OpenConsoleRsp command (step 1202). FIG. 13B illustrates the structure of the OpenConsoleRsp command. OpenConsoleRsp represents the type of command, Datasize indicates the length of data that follows the command, and Result indicates acceptance of OpenConsoleReq is OK or NG. OK is sent back if preparations for display on the control panel have been completed and a display is possible. NG is sent back if display preparations have not been completed. In case of NG, the formatter 4 issues the OpenConsoleReq command again after a predetermined period of time.

Figure 13C:
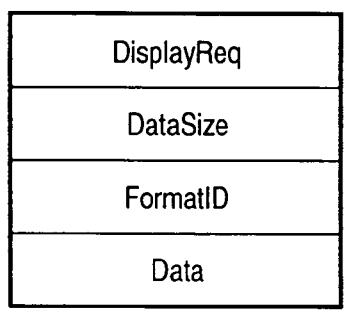

If display on the control panel is OK, then the formatter 4 issues a DisplayReq command (step 1203) for requesting the display of an initial screen. When the formatter 4 subsequently requests display, it transmits the DisplayReq command. FIG. 13C illustrates the structure of the DisplayReq command. Display indicates the type of command, Datasize the length of data that follows the command, FormatID the type of screen format and Data the detailed data of each screen format.

Figure 13D:
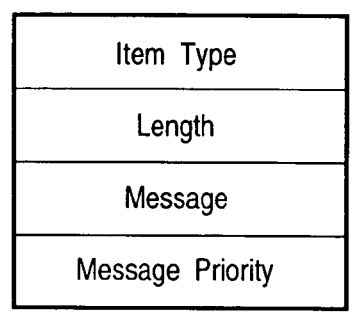

FIG. 13D illustrates an example of Data in a case where a message is displayed in the message section of screen format 1 (FIG. 16C).

ItemType indicates the display type of screen format 1. If the display type is 0, this indicates display of a message only. If the display type is 1, this indicates display only of an item. In this case, 0 is set. Length indicates the length of the displayed message, Message the character string of the message, and MessagePriority the type of message. The message types are 0: ready; 1: error; 2: operator call; 3: service call.

Figure 13E:

After the request for display of the initial screen, the formatter 4 issues a KeyEnable command that enables acceptance of a key-input operation from the control panel 6 (step 1204). FIG. 13E illustrates an example of the KeyEnable command. KeyEnable indicates the type of command.

Figure 13F:
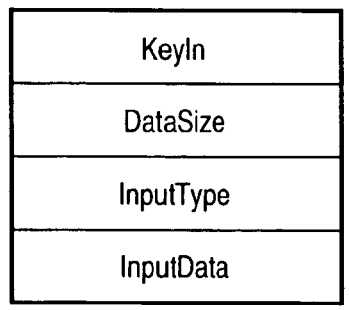

If an input is made by pressing a key on the control panel 6, the image input/output controller 3 sends the formatter 4 the KeyInput command. FIG. 13F illustrates an example of the KeyInput command. KeyIn indicates the command type, Datasize the length of data that follows the command, and InputType the type of key input. The key-input types are 0: function key; 1: item selection; 2: numerical input; 3: character input; etc. InputData indicates the data actually entered.

Figure 13G:
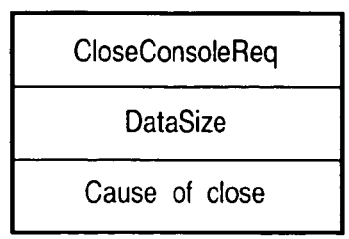
Figure 13H:
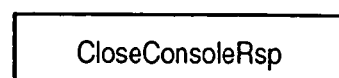

This is usually followed by repeating this sequence (steps 1203 to 1205). However, in a case where only the formatter 4 is placed in the state for re-introduction of power (hard reset) by an order from the formatter 4, it is necessary to perform an exchange for the purpose of halting the control-panel sequence temporarily. In such case the formatter 4 issues a CloseConsoleReq command (step 1206). FIG. 13G illustrates an example of the CloseConsoleReq. CloseConsoleReq indicates the command type, Datasize the length of data that follows the command, and Cause of Close the reason (e.g., hard reset) for halting the sequence. In response, the image input/output controller 3 sends back a CloseConsoleRsp command (step 1207). As a result, the control-panel sequence between the image input/output controller 3 and the formatter 4 is halted. FIG. 13H illustrates the format of CloseConsoleRsp.

Next, a process between the formatter 4 and the image input/output controller 3 in a case where a service call has occurred in the formatter 4 will be described with reference to FIG. 14.

Figure 14:
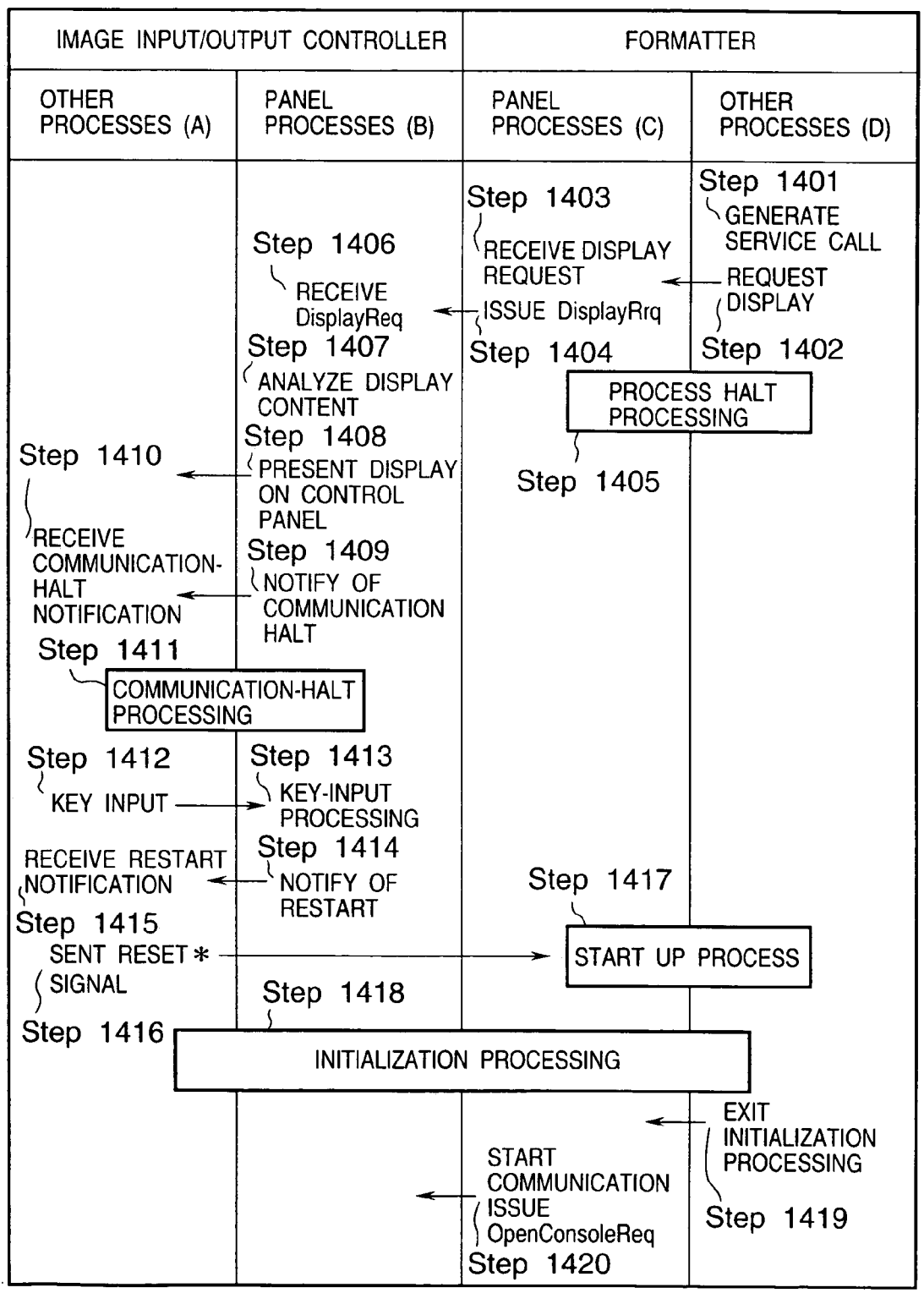
FIG. 14 is a diagram showing a process between the formatter and image input/output controller in a case where a service call has been generated in the formatter.

In FIG. 14, (B) indicates control-panel processes within the image input/output controller 3, (A) other processes within the image input/output controller 3, (C) control-panel processes within the formatter 4, and (D) other processes within the formatter 4.

First, when a service call is generated in a certain process within the formatter 4 (step 1401), a service-call display request is sent to the panel process (step 1402). Upon receiving the service-call display request from the certain process (step 1403), the control-panel process sends the DisplayReq command to the control-panel process of image input/output controller 3 (step 1404). When issuance of the DisplayReq command ends, the formatter 4 halts all processes (step 1405). When the Display command is received in the control-panel process of the image input/output controller 3 (step 1406), the display content is analyzed (step 1407) and a display is presented on the control panel (step 1408). In case of a service-call message display request, other processes of the image input/output controller 3 are notified so as to halt communication with the formatter 4 (step 1409). The process that has received termination of communication (step 1410) and the control-panel process execute processing for terminating communication with the formatter 4 (step 1411). In a case where communication with the formatter 4 is halted in an ordinary sequence, the procedure indicated by steps 1206 and 1207 in FIG. 12 is followed. When a service call is generated, however, communication is terminated at this time.

Reference will now be had to FIGS. 17A–17D and 18 to describe processing (steps 1412 and 1413) in a case where a key input operation (pressing of the printer mode key 605) for displaying a screen on the formatter 4 while communication with the formatter 4 is halted is carried out. When the printer mode key 605 is pressed, first it is determined whether the screen currently being displayed is the screen for the printing mode or the screen for some other mode (step 1801). If the screen for the printing mode is already being displayed, processing is exited at this time. If the screen for another mode is being displayed, it is determined whether communication with the formatter 4 is in progress (step 1802). If communication with the formatter 4 is being performed in the usual manner, a KeyIn command is issued (step 1806) and processing is terminated.

If communication with the formatter 4 has been halted, it is determined whether the formatter 4 is undergoing a restart operation (step 1803). If the formatter 4 is not undergoing restart, notification is given of the fact that a service call has been generated, a screen (FIG. 17A) for initiating the restart operation is displayed (step 1805) and processing is terminated.

If the formatter 4 is undergoing restart, a screen (FIG. 17B) for notifying that restart is in progress is displayed and processing (step 1804) is terminated. It should be noted that even when the formatter 4 is involved in a service call or is being restarted, the other functions continue to operate in the image input/output controller 3 and it is therefore possible to make a transition to another mode screen. FIG. 17D illustrates an example of a screen when the facsimile mode key 604 is pressed while the formatter 4 is involved in a service call or is being restarted.

Figure 17A:
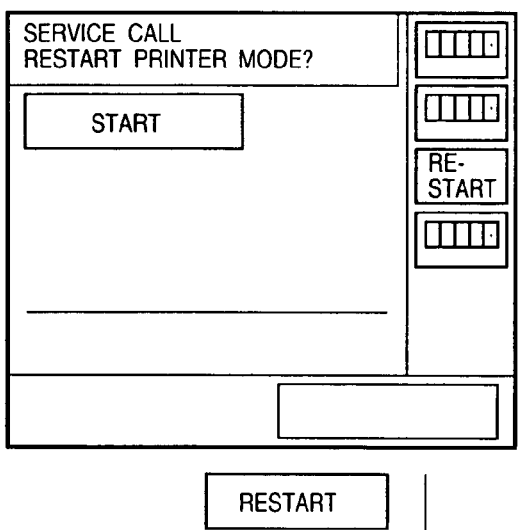
FIGS. 17A to 17D are diagrams illustrating an example of the flow of screens in a case where a service call has been generated in the formatter.
Figure 17B:
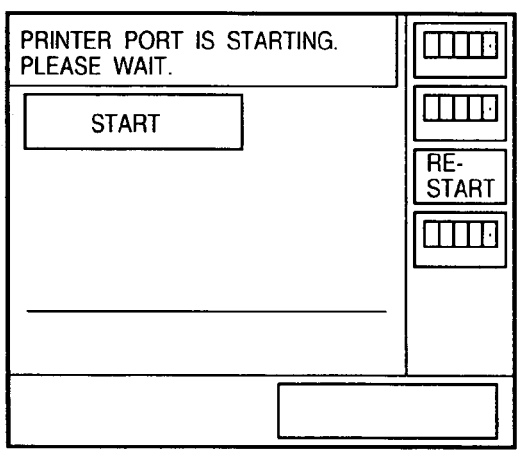
Figure 17C:
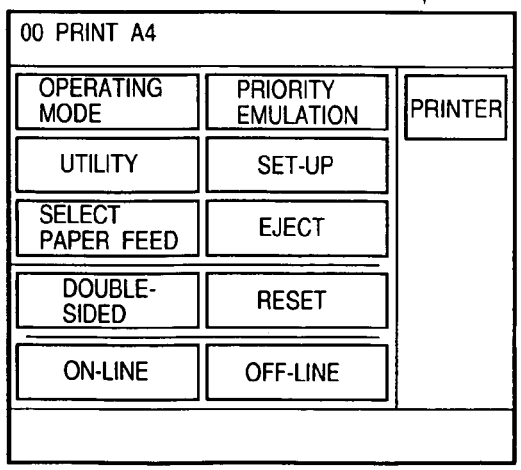
Figure 17D:
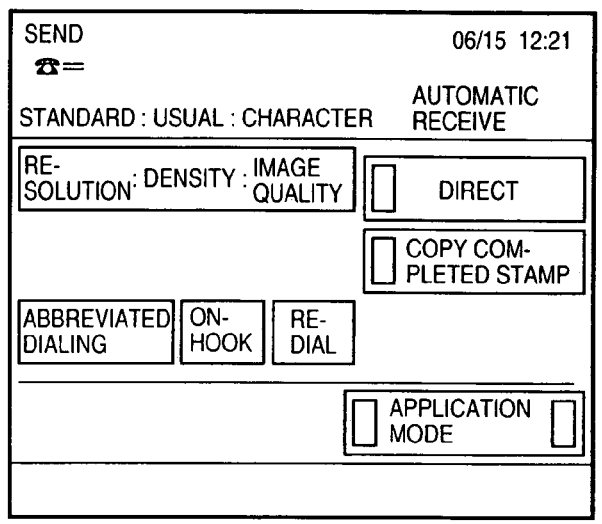
Figure 18:
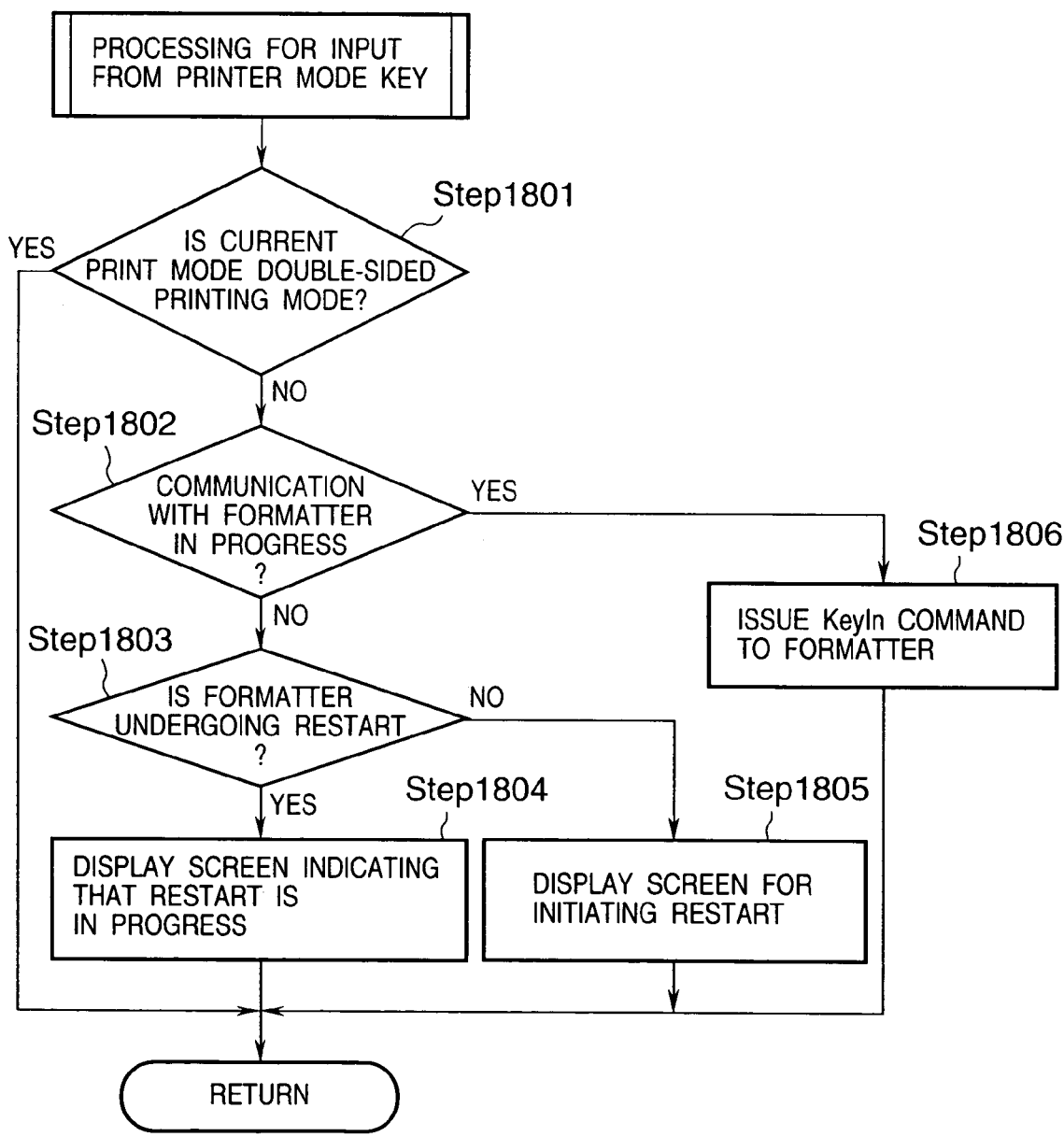
FIG. 18 is a diagram illustrating processing executed in the image input/output controller in a case where a print mode key has been pressed.

With reference again to FIG. 14, when initiation of restart is designated using the screen of FIG. 17A, the reset process of the image input/output controller 3 is so notified (step 1414). The reset process receives the reset designation (step 1415) and sends the RESET* signal to the formatter 4 (step 1416).

When the formatter 4 receives the RESET* signal, the CPU is reset, the program is rebooted and each process is started up (step 1417).

Communication initialization processing is thenceforth executed between the formatter 4 and the image input/output controller 3 in a manner similar to that when power is introduced in the usual fashion (step 1418). When processing ends in the initialization of the formatter 4 (step 1419), each process is so notified (step 1419). Upon receiving this notification, the panel process sends the image input/output controller 3 the OpenConsoleReq command and starts the control-panel sequence (step 1420).

In accordance with the above-described procedure, if a fatal error requiring a service call occurs in the formatter 4 which generates image data from input PDL data, a request to present a display indicative of this fact is issued to the image input/output controller 3. If the image input/output controller 3 receives this request, therefore, the controller presents the display in response to this request, halts communication with the formatter 4 and sends a reset signal to the formatter 4. Thus, only the formatter 4 is initialized, the error condition is eliminated without shutting down the main power supply and only the printer function is restarted. The other functions, e.g., the scanner and facsimile function, are not initialized and continue to operate.

Second Embodiment

In the first embodiment, notification of the fact that a service call has been generated in the formatter 4 is given by the content of the message display sent from the formatter 4, and communication is then terminated. With this method, however, communication cannot be terminated normally if the process shuts down in the formatter 4 before the display request is issued. In such case it is possible to adopt an arrangement in which monitoring is performed at all times to determine that the formatter 4 is operating normally and communication is halted immediately if an abnormality is sensed, whereby only the formatter 4 is restarted in a manner similar to that of the first embodiment.

To accomplish this, use is made of, e.g., a status monitor, which is a logical port between the image input/output controller 3 and the formatter 4, and a StatusReq command for acquiring the status of the formatter 4 is issued by the image input/output controller 3 constantly at regular intervals while the formatter 4 is starting up. While it is operating normally, the formatter 4 sends back a StatusRsp command to the image input/output controller 3. If after it issues the StatusReq command a predetermined period of time elapses before the StatusRsp command is sent back, the image input/output controller 3 judges that a fatal error has occurred in the formatter 4, halts communication with the formatter 4 and displays the screen for resetting the formatter 4. This is followed by executing a procedure similar to that from step 11 onward in FIG. 14.

According to this procedure, even if the formatter 4 cannot notify the image input/output controller 3 of the occurrence of a fatal error, the image input/output controller 3 senses the abnormality that occurred in the formatter 4 and then restarts the formatter. As a result, the error can be eliminated without affecting functions other than the formatter function.

EFFECTS OF THE INVENTION

Thus, in accordance with the present invention, as described above, even if a printing function develops a fatal error, recovery of the printing function can be achieved, without shutting down the main power supply, in such a manner that functions that do not utilize the printing function are unaffected.

As many apparently widely different embodiments of the present invention can be made without departing from the spirit and scope thereof, it is to be understood that the invention is not limited to the specific embodiments thereof except as defined in the appended claims.

What is claimed is:

1. An image output apparatus comprising:
    an image generator adapted to generate bitmap data based upon page description language transmitted from a host computer;
    a controller adapted to receive the bitmap data generated by said image generator and transmit the bitmap data to an image forming unit; and
    an image forming unit adapted to record an image on a recording medium based upon the bitmap data inputted from said controller,
    wherein said controller detects an occurrence of an error in said image generator and, when the error has been detected, said controller issues to said image generator an order to execute a reset whereas said controller does not issue to said image forming unit an order to execute a reset,
    and wherein said image generator executes a reset in response to the order to execute a reset, and
    said controller judges that an error has occurred in said image generator if an instruction that has been transmitted to said image generator is not responded to in a predetermined period of time.

2. The apparatus according to claim 1, wherein said image generator detects the occurrence of a fatal error and so notifies said controller, whereby said controller detects the occurrence of an error in said image generator.

3. The apparatus according to claim 1, wherein said controller, which has detected the occurrence of an error in said image generator, halts communication with said image generator and notifies an operator of occurrence of the error by a display or sound before the order to reset is issued to said image generator.

4. The apparatus according to claim 1, further comprising a converter for reading in an image and converting the image to image data.

5. The apparatus according to claim 1, further comprising a unit for sending and receiving image data via a communication line.

6. The apparatus according to claim 1, further comprising an input unit for allowing an operator to perform an input;
    wherein when an order to reset to recover from an error is input by said input unit in response to occurrence of the error, said controller issues said image generator an order to reset.

7. An image output apparatus comprising:
    an image generator adapted to generate bitmap data based upon page description language transmitted from a host computer;
    a controller adapted to receive the bitmap data generated by said image generator and transmit the bitmap data to an image forming unit;
    an image forming unit adapted to record an image on a recording medium based upon the bitmap data inputted from said controller; and
    a display unit adapted to display a screen image on which a user inputs an instruction,
    wherein said controller detects an occurrence of an error in said image generator and, when the error has been detected, said controller issues to said image generator an order to execute a reset whereas said controller does not issue to said image forming unit an order to execute a reset,
    and wherein said image generator executes a reset in response to the order to execute a reset, and said controller issues said image generator the order to to reset, in response to an instruction to reset said image generator with said display unit.

8. The apparatus according to claim 7, wherein said image generator transmits a display request for said display unit to said controller in response to an error occurred in said image generator and said controller controls displaying the screen image by said display unit in response to the display request transmitted from said image generator.

9. The apparatus according to claim 8, wherein said controller halts a communication with said image generator in response to the display request transmitted from said image generator.

10. An image output apparatus comprising:
  an image generator adapted to generate bitmap data based upon page description language transmitted from a host computer;
  a controller adapted to receive the bitmap data generated by said image generator and transmit the bitmap data to an image forming unit; and
  an image forming unit adapted to record an image on a recording medium based upon the bitmap data inputted from said controller,
  wherein said controller detects an occurrence of an error in said image generator and, when the error has been detected, said controller issues to said image generator an order to execute a reset whereas said controller does not issue to said image forming unit an order to execute a reset,
  and wherein said image generator executes a reset in response to the order to execute a reset, and said controller, which has detected the occurrence of an error in said image generator, halts communication with said image generator and notifies an operator of occurrence of the error by a display or sound before the order to reset is issued to said image generator.

11. The apparatus according to claim 10, wherein said image generator detects the occurrence of a fatal error and so notifies said controller, whereby said controller detects the occurrence of an error in said image generator.

12. The apparatus according to claim 10, wherein said controller judges that an error has occurred in said image generator if an instruction that has been transmitted to said image generator is not responded to in a predetermined period of time.

13. The apparatus according to claim 10, further comprising a converter for reading in an image and converting the image to image data.

14. The apparatus according to claim 10, further comprising a unit for sending and receiving image data via a communication line.

15. The apparatus according to claim 10, further comprising an input unit for allowing an operator to perform an input;
  wherein when an order to reset to recover from an error is input by said input unit in response to occurrence of the error, said controller issues said image generator an order to reset.

* * * * *